(12) United States Patent
Patchornik

(10) Patent No.: US 7,385,356 B2
(45) Date of Patent: Jun. 10, 2008

(54) ENERGY SAVING STARTUP CIRCUIT FOR POWER SUPPLY

(75) Inventor: Joshua Patchornik, Ramat Gan (IL)

(73) Assignee: Lightech Electronics Industries, Ltd., LOD (IL)

( * ) Notice: Subject to any disclaimer, the term of this patent is extended or adjusted under 35 U.S.C. 154(b) by 397 days.

(21) Appl. No.: 10/541,751

(22) PCT Filed: Jul. 24, 2003

(86) PCT No.: PCT/IL03/00606

§ 371 (c)(1),
(2), (4) Date: Jul. 8, 2005

(87) PCT Pub. No.: WO2004/059824

PCT Pub. Date: Jul. 15, 2004

(65) Prior Publication Data

US 2007/0103948 A1    May 10, 2007

(30) Foreign Application Priority Data

Dec. 24, 2002  (IL) .................................. 153606

(51) Int. Cl.
*H05B 37/02* (2006.01)
(52) U.S. Cl. .................. 315/209 T; 315/209 CD; 315/299
(58) Field of Classification Search ............ 315/200 R, 315/201, 209 R, 209 CD, 209 T, 224, 246, 315/247, 291, 294, 299
See application file for complete search history.

(56) References Cited

U.S. PATENT DOCUMENTS

| | | | |
|---|---|---|---|
| 4,460,951 A * | 7/1984 | Fenter et al. ................. | 363/49 |
| 5,449,979 A * | 9/1995 | Ueoka et al. ................ | 315/225 |
| 5,477,175 A * | 12/1995 | Tisinger et al. ............. | 327/143 |
| 5,880,942 A | 3/1999 | Leu .............................. | 363/49 |
| 6,246,596 B1 | 6/2001 | Yamazaki ..................... | 363/49 |

FOREIGN PATENT DOCUMENTS

| | | |
|---|---|---|
| DE | 42 27 183 A1 | 2/1994 |
| JP | H10-257759 | 9/1998 |
| JP | 2001-275347 | 10/2001 |

OTHER PUBLICATIONS

Chinese Official Action dated Aug. 31, 2007.

* cited by examiner

*Primary Examiner*—Thuy Vinh Tran
(74) *Attorney, Agent, or Firm*—Browdy and Neimark

(57) ABSTRACT

A startup circuit (30) for a power supply (44), has an input (31) for connecting to a source of high voltage thereto, and an output rail (33) for feeding rectified voltage to the power supply. A first energy storage device (35) is coupled to the output rail for storing energy when voltage is first applied to the input, and a second energy storage device (37) is coupled to an output of the power supply for storing energy when a voltage appearing at the output of the power supply reaches substantially steady state. A switching circuit (36, 50) is coupled to the first energy storage device and the second energy storage device and is responsive to the first energy storage device having sufficient energy for transferring the energy to the second energy storage device and disconnecting the first energy storage device from the output rail.

14 Claims, 4 Drawing Sheets

ENERGY SAVING STARTUP CIRCUIT FOR POWER SUPPLY

This Application is a National Phase Application filed under 35 U.S.C. 371 claiming the benefit of a prior international application No. PCT/IL03/00606 filed Jul. 24, 2003 having the benefit of an Israel Application No. 153606 filed Dec. 24, 2002.

FIELD OF THE INVENTION

This invention relates to startup circuits for driving low voltage equipment such as light emitting diodes (LEDs).

BACKGROUND OF THE INVENTION

Electrical equipment requiring low voltage DC are frequently energized by mains operated power supplies. FIG. 1 shows schematically a conventional startup circuit 1 in a typical low voltage power supply, wherein mains voltage 2 is rectified typically by a bridge rectifier 3 and then fed via a resistor 4 to a control circuit (not shown) in the power supply. The input voltage to the control circuit is maintained at a required level by a zener diode 5 connected in parallel with a capacitor 6.

During operation, the resistor 4, which will be referred to throughout as a "starting resistor", feeds current to the capacitor 6 which therefore charges to a value determined by the zener diode 5, thus ensuring a constant voltage input to the control circuit Typically, the mains voltage is 110 VAC in the USA or 220 VAC in Europe, while the equipment operates on a much lower voltage, such as 30 volts or even less. The startup circuit 1 serves to energize the power supply directly from the mains supply after it is first switched on in a controlled manner. However, once the power supply is operating and has reached a steady state voltage, there is no longer any need to supply energy to the starting circuit, which is now redundant.

A drawback with the arrangement shown in FIG. 1 is that even under steady state conditions, when the starting circuit is no longer necessary, the constant flow of current through the starting resistor 4 manifests itself as a constant energy loss, thus reducing the overall efficiency of the power supply. The amount of power dissipated in the starting resistor 4 is a function of the difference between the input voltage and the output voltage, since the closer the output voltage is to the input voltage in the steady state, the less is the voltage dropped across the starting resistor and therefore the lower is the energy loss therethrough. In power supplies designed to operate from a single voltage power supply only, it is possible to optimize the circuit components so as to reduce the constant energy loss through the starting resistor. However, in so-called universal power supplies that are intended to operate over a range of power supply voltages, such as 85-277 VAC so as to be suitable for both the US and European markets, such optimization is difficult to achieve and it becomes impossible to minimize the energy loss through the starting resistor for all supply voltages.

It would therefore be desirable to dispense with the starting resistor once the power supply is operating normally and reaches steady state. The prior art has recognized this need although apparently not in a universal power supply. Thus, reference is made to FIG. 2 showing a prior art power supply 10 disclosed by JP 2001275347 published Oct. 5, 2001 and assigned to Toshiba Lighting & Technology Corporation. The reference numerals shown in the figure are those that are appear in the abstract of this publication, and only the relevant components will now be described.

The power supply unit 10 includes a starting resistor 17 that feeds the output from a bridge rectifier 13 to a control circuit 16 on startup via a first transistor 18. A startup circuit feeds the output from the bridge rectifier 13 to the first transistor 18, thus maintaining the flirt transistor 18 conducting during starting and feeding power to the control circuit. A second transistor 21 is driven by a potential difference between the input and the output of a voltage regulator 22 and maintains constant voltage generated in a primary auxiliary winding 15b of an output transformer 15 after startup. The second transistor 21 feeds the resulting voltage to the control circuit, which is driven thereby, and inverts the first transistor from conduction to cutoff thereby effectively disconnecting the starting resistor 17.

Thus, the power supply unit saves electricity during standby by separating starting resistance after a startup (of a switching circuit), and driving the control circuit of a main switching element by only power generated in an output transformer.

It will be seen from FIG. 2 that an electrolytic capacitor 23 is connected across the input immediately after the bridge rectifier 13. The purpose of the electrolytic capacitor 23 is to store energy from the mains and serve as an auxiliary supply in the event of a momentary outage or fluctuations in the main voltage. In order to serve this function, the capacitor 23 must have a high capacitance and indeed this is the reason that an electrolytic capacitor is employed. However, the connection of a high capacitance at the input of the circuit militates against the power supply having near unity power factor. This may not matter too much when the power supply is to be used with computers and the like. However, there are many applications where near unity power factor is required and, in such cases, the circuit shown in JP 2001275347 is unsuitable.

In order to achieve near unity power factor, a high capacitance of the order of 200 nF is usually disposed near the output of the power supply. This increases the time that it takes for steady state to be reached and this in turn increases the time before the startup circuit must be disabled. In JP 2001275347 the time taken between the first switch 18 opening and the second switch 14 closing is too fast to allow complete charging of such capacitance. This also indicates that the circuit disclosed in JP 2001275347 is unsuited for use with power supplies having near unity power factor.

It would therefore be desirable to provide a startup circuit for a power supply, particularly a universal power supply having near unity power factor, wherein the starting resistor is disconnected after the power supply has reached steady state, thereby preventing energy loss and improving efficiency.

SUMMARY OF THE INVENTION

It is therefore an object of the invention to provide a startup circuit for a power supply having near unity power factor, having a starting resistor that is disconnected after the power supply has reached steady state, thereby preventing energy loss and improving efficiency.

To this end there is provided in accordance with the invention a startup circuit for a power supply, said startup circuit comprising:

an input for connecting a source of high voltage thereto, an output rail for feeding rectified voltage to the power supply, a first energy storage device coupled to the output rail for storing energy when voltage is first applied to the input, a second energy storage device coupled to an output of the power supply for storing energy when a voltage appearing at the output of the power supply reaches substantially steady state, and a switching circuit coupled to the first energy storage device and to the second energy storage device and being responsive to the first energy storage device having sufficient energy for transferring said energy to the second energy storage device and disconnecting the first energy storage device from the output rail.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
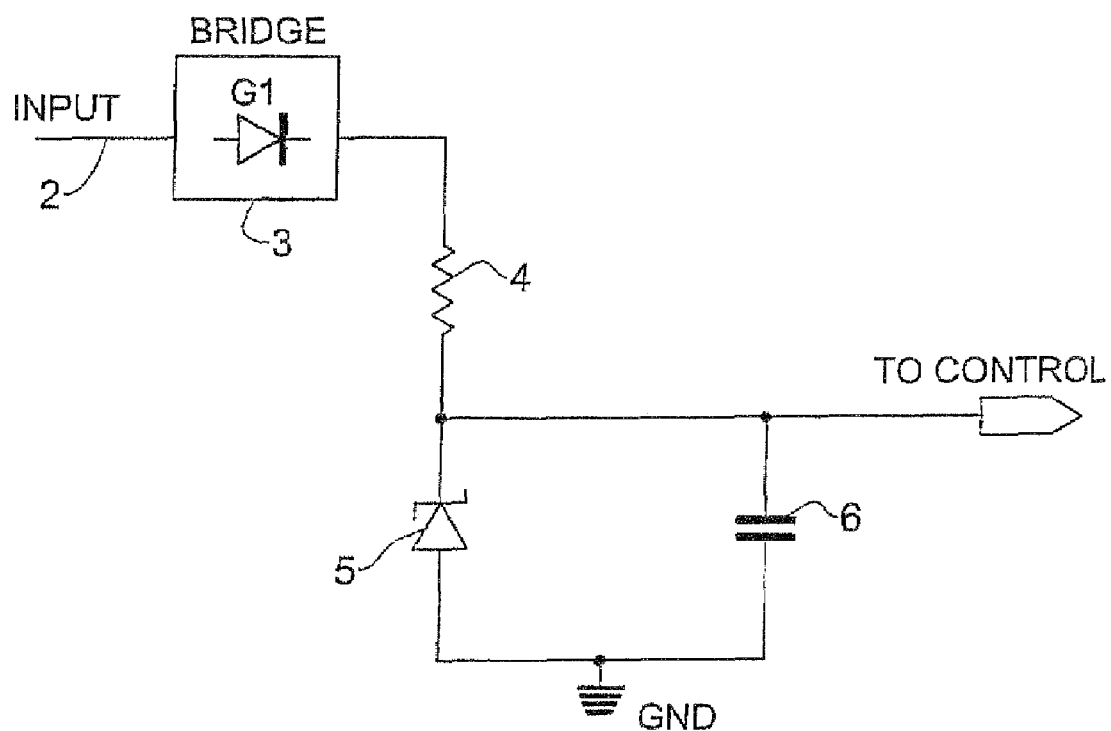
FIG. 1 is a partial circuit diagram showing schematically a conventional startup circuit in a typical low voltage power supply.
Figure 2:
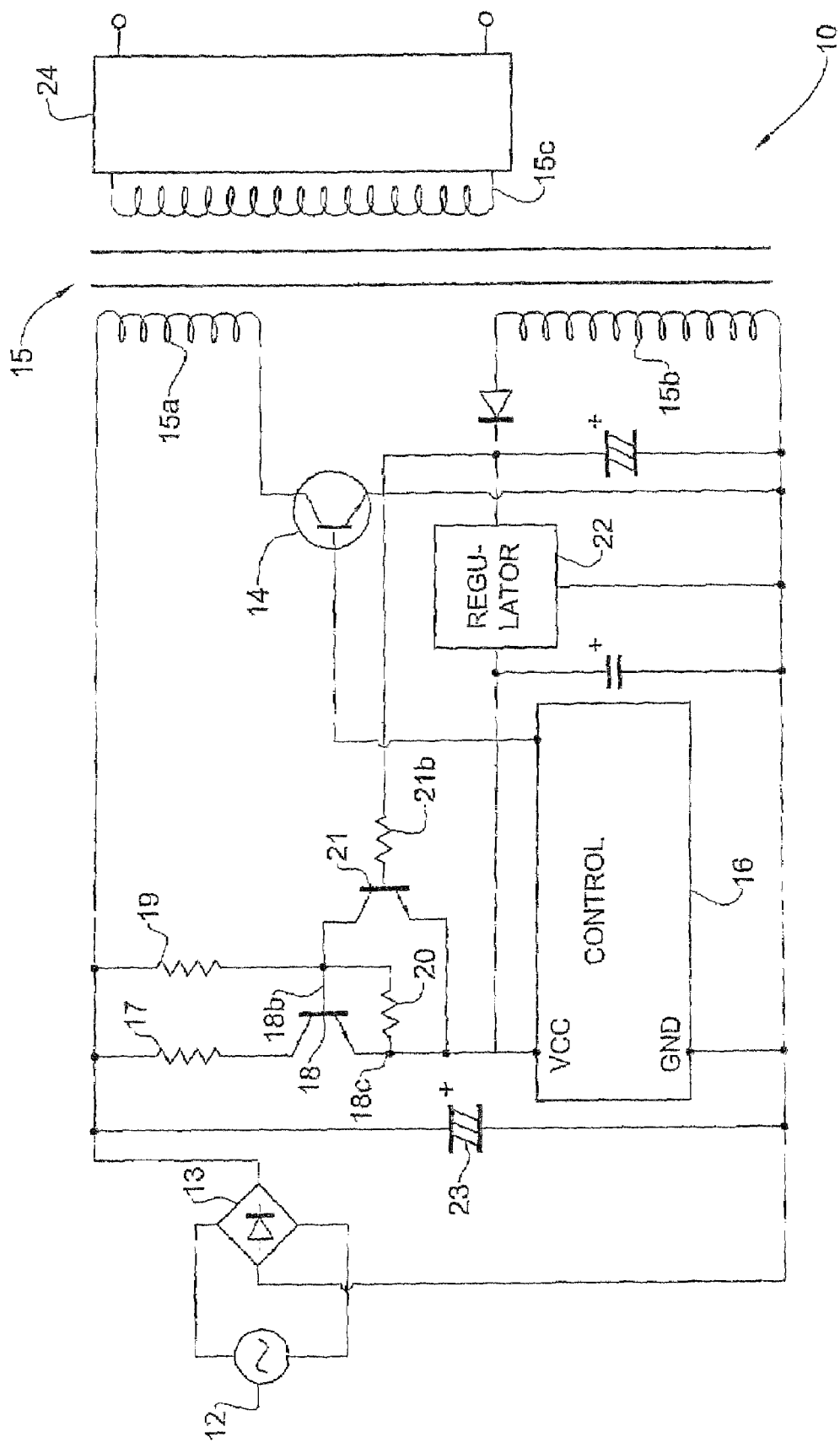
FIG. 2 is a partial circuit diagram showing schematically a prior art power supply.
Figure 3:
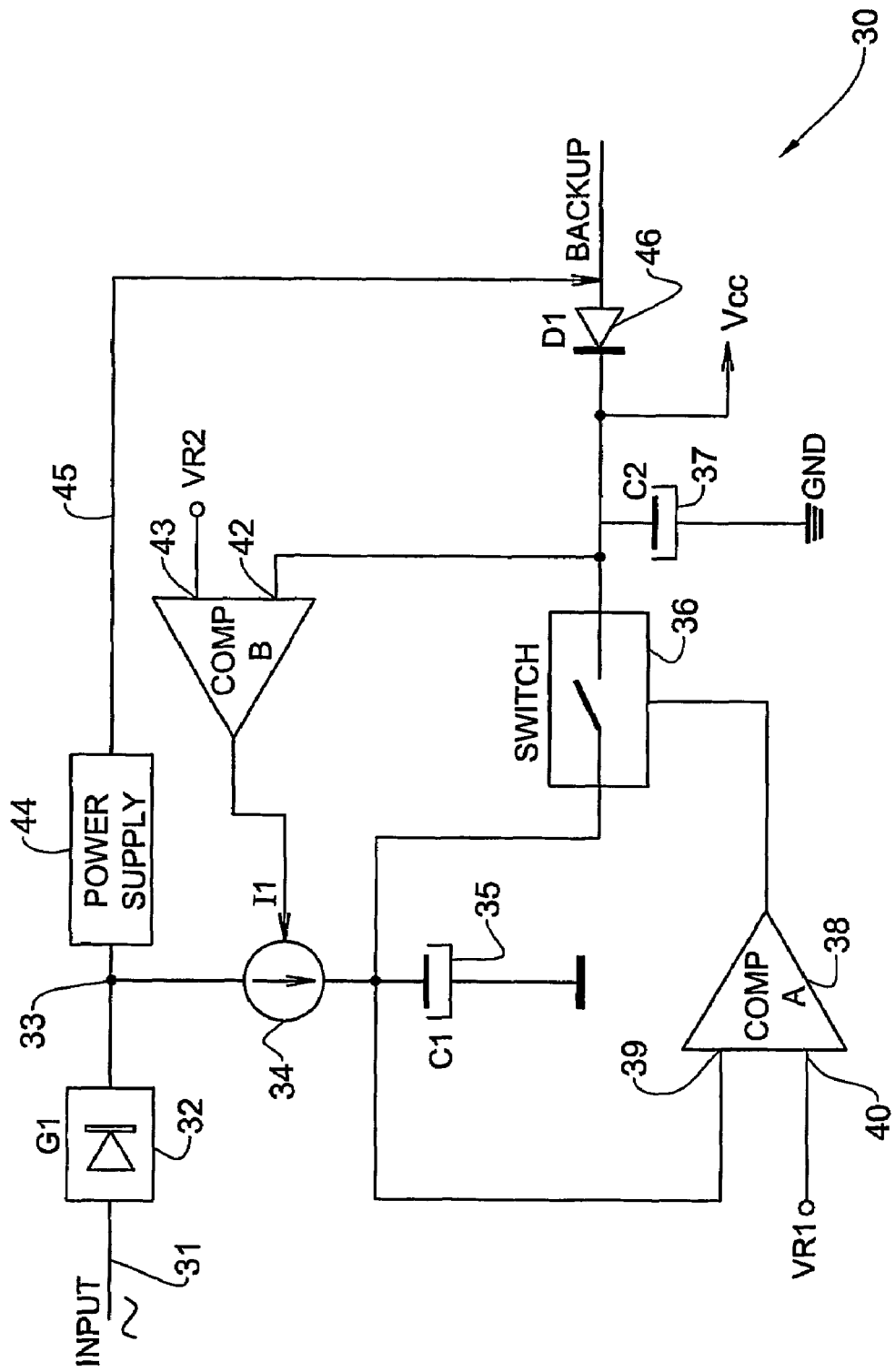
FIG. 3 is a block diagram showing functionally an improved startup circuit according to the invention.

FIG. 3 is a block diagram showing functionally an improved startup circuit according to the invention having an input 31 for connecting thereto a mains supply voltage (constituting a source of high voltage). Typically, such supply has a voltage of 110 VAC in the USA or 220 VAC in Europe. The input 31 is connected to a bridge rectifier 32 having an output 33 that feeds rectified voltage to a current source 34 that is coupled to one end of a capacitor 35 (constituting a first energy storage device) whose other end is connected to GND.

A normally open switching circuit 36 is coupled to the first capacitor and to a second capacitor 37 (constituting a second energy storage device) and is responsive to the output of a first comparator 38 having a first input 39 connected to the positive voltage terminal of the first capacitor 35 and having a second input 40 connected to a first reference voltage (VR1). The current source 34 is responsively coupled to the output of a second comparator 41 having a first input 42 connected to the positive voltage terminal of the second capacitor 37 and having a second input 43 connected to a second reference voltage (VR2). The rectified output 33 of the bridge rectifier 32 is fed to a power supply 44 that is designed to operate near unity power factor and has an output 45 that is fed to the cathode of a rectifier diode 46 whose anode is connected to the positive voltage terminal of the second capacitor 37.

Operation of the startup circuit 30 is as follows. Upon power-up, the constant source 34 feeds current into the first capacitor 35 and charges it to full charge. During this time, the rectifier output 33 feeds the power supply 44 and charges the output capacitor (not shown) therein which ensures that the power supply operates at or near unity power factor. The switch 36 is open, such that the first capacitor 35 is electrically isolated from the second capacitor 37. The power supply itself is not shown in FIG. 3, but once it is up and running it charges the second capacitor 37 via the rectifier diode 46. Thus when the circuit reaches steady state, the second capacitor 37 serves as a reservoir to the power supply in the event of momentary loss of supply voltage.

When the voltage across the first capacitor 35 exceeds the first reference voltage (VR1), the first comparator 38 produces a switching signal that causes the normally open switch 36 to close, thereby connecting the first capacitor 35 in parallel with the second capacitor 37 and transferring energy stored in first capacitor to the second capacitor. Likewise, when the voltage across the second capacitor 37 exceeds the second reference voltage (VR2), the second comparator 41 produces a switching signal that disconnects the current source 34, thereby preventing further charging of the first capacitor 35. The voltage thresholds VR1 and VR2 are chosen to be close to the voltages at full charge of the first and second capacitors, respectively. Thus, when the first capacitor 35 is substantially fully charged, the switch 36 closes and the stored energy in the first capacitor 35 is transferred to the second capacitor 37. This helps to boost the charge on the second capacitor 37, which reaches the voltage threshold VR2. When this occurs, the current source 34 is disconnected from the first capacitor 35, thus preventing it from becoming charged during steady state operation of the power supply and saving energy. As will be explained below with reference to FIG. 4 of the drawings, the current source 34 includes a resistor via which the first capacitor 35 is charged. So disabling the current source 34 prevents the flow of current through this resistor, which would otherwise be dissipated as ohmic losses.

Figure 4:
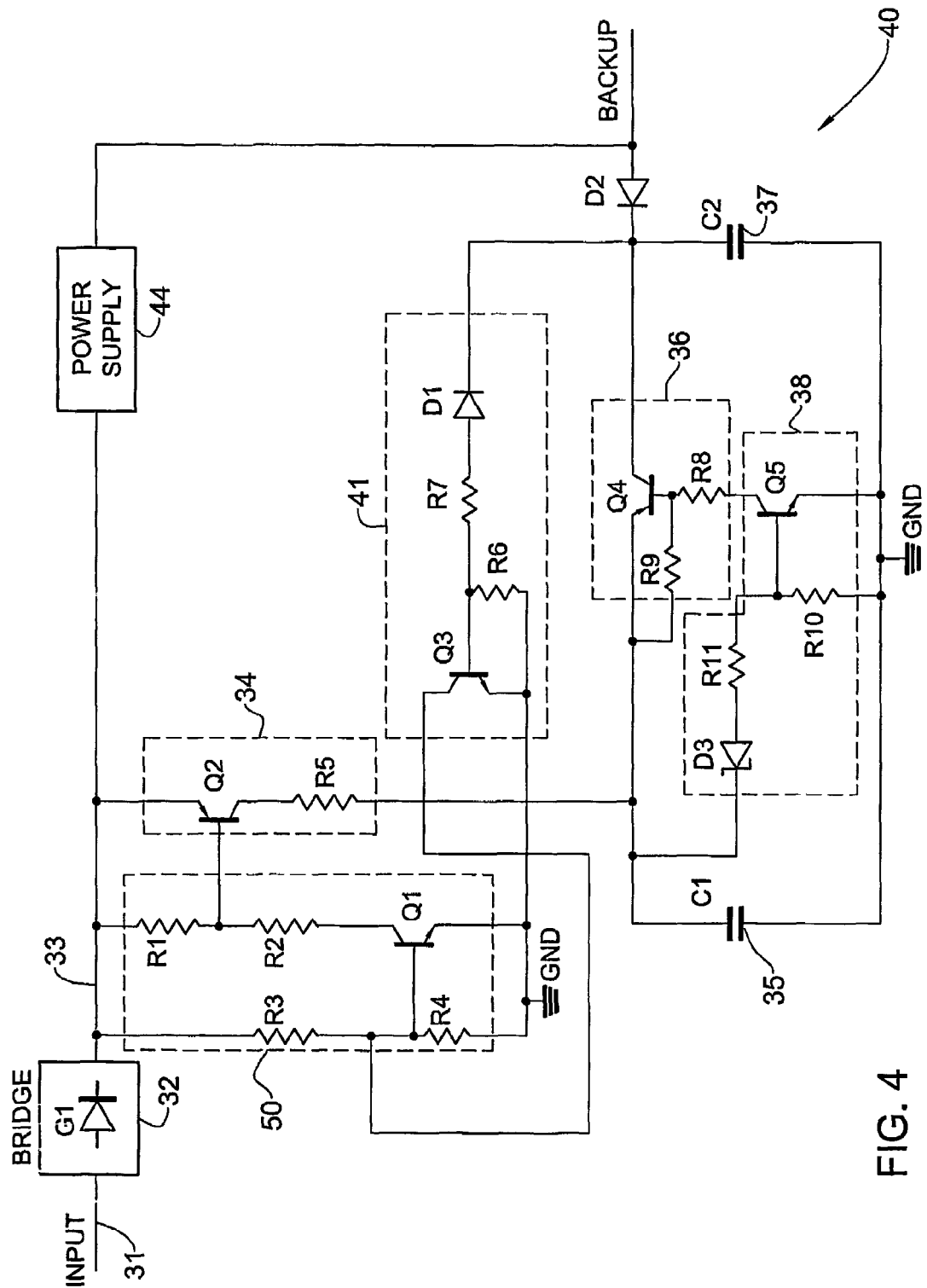
FIG. 4 is a partial circuit diagram showing schematically a practical embodiment of the startup circuit shown in FIG. 3.

Referring now to FIG. 4 there will be described a partial circuit diagram showing schematically an actual implementation of a startup circuit 40 operating as described above with reference to FIG. 3. Features that are common to both figures will be referenced by identical reference numerals. Thus, the input supply voltage 31 is fed to a bridge rectifier 32 whose positive output serves as an output rail 33 that is fed via a first voltage divider comprising resistors R1 and R2 connected in series to the collector of an NPN bipolar junction transistor Q1, whose emitter is connected to GND. A second voltage divider is formed by a resistor R3 connected at one end to the output rail 33 and connected in series at its other end to one end of a resistor R4 whose other end is connected to GND.

The emitter of a PNP bipolar junction transistor Q2 is connected to the output rail 33, its base is connected to the junction of the resistors R1 and R2, and its collector is connected via a resistor RS to a first end of a first capacitor C1 whose second end is connected to GND and corresponds to the first capacitor 35 in FIG. 3. The junction of the resistors R3 and R4 is connected to the collector of an NPN bipolar junction transistor Q3, whose emitter is connected to GND. A resistor R6 is connected between the base and emitter of the transistor Q3 and its base is connected via a resistor R7 to the anode of a first zener diode D1 whose cathode is connected to a first end of a second capacitor C2 whose second end is connected to GND and corresponds to the second capacitor 37 in FIG. 3. The cathode of the first zener diode D1 is connected to the cathode of a rectifier diode D2, whose anode is connected to the positive supply rail of the power supply 44.

The first end of the second capacitor C2 is also connected to the collector of a PNP bipolar junction transistor Q4, whose emitter is connected to the first end of the first capacitor C1 and whose base is connected via a resistor R8 to the collector of an NPN bipolar junction transistor Q5.

Between the base and emitter of the PNP bipolar junction transistor Q4 there is connected a resistor R9. The emitter of the transistor Q5 is connected to GND and its base is connected to the junction of a voltage divider comprising series connected resistors R10 and R11 connected between GND and the anode of a zener diode D3 whose cathode is connected to the first end of the first capacitor C1.

In an actual circuit reduced to practice the following circuit components were used, where significant:

| Component | Value | Component | Value/Rating |
|---|---|---|---|
| R1 | 47K | C1 | 220µ |
| R2 | 100K | C2 | 22µ |
| R3 | 1.5M | D1 | 15 V |
| R4 | 47K | D2 | — |
| R5 | 47K | D3 | 25 V |
| R6 | 10K | Q1 | FMMT458 |
| R7 | 47K | Q2 | FMMT558 |
| R8 | 47K | Q3 | PMBT222A |
| R9 | 10K | Q4 | PMBT2907 |
| R10 | 47K | Q5 | BCV47 |

The startup circuit 40 is equivalent to the functional schematic shown in FIG. 3 and its operation is therefore identical. Thus, the PNP bipolar junction transistor Q2 in conjunction with the resistor R5 constitutes the current source 34 shown in FIG. 4. Resistors R1, R2, R3, R4 in combination with the transistor Q1 constitute a first switch 50 for controlling the current source 34. Resistors R10, R11 in combination with the zener diode D3 and the transistor Q5 constitute the first comparator 38, the breakdown voltage of the zener diode D3 establishing the first voltage threshold VR1. Likewise, resistors R6, R7 in combination with the zener diode D1 and the transistor Q3 constitute the second comparator 41, the breakdown voltage of the zener diode D1 establishing the first voltage threshold VR2. Resistors R8 and R9 in combination with the transistor Q4 constitute a second switch corresponding to the switch 36 shown in FIG. 3 for coupling the first and second capacitors C1 and C2. The first switch 50 and the second switch 36 may be functionally considered as a switching circuit that is responsive to the first capacitor C1 having sufficient energy for transferring the energy to the second capacitor C2 and disconnecting the first capacitor C1.

On power-up, Q1 is cutoff and therefore the base potential of the transistor Q2 is substantially zero. Since Q2 is a PNP bipolar junction transistor it conducts current from the output rail 33 through the resistor R5, thereby charging the first capacitor C1. For so long as the voltage across the first capacitor C1 is less than the breakdown voltage of the zener diode D3, the base potential of the transistor Q5 is less than the $V_{BE}$ breakdown voltage and Q5, being an NPN device, is therefore cutoff. Current flows from the current source 34 into the base of the transistor Q4.

Since Q4 is a PNP device it is therefore cutoff and the first and second capacitors C1 and C2 are decoupled. When the voltage across the first capacitor C1 reaches the breakdown voltage of the zener diode D3, the base voltage of Q5 exceeds the $V_{BE}$ breakdown voltage and transistor Q5 therefore conducts. This pulls the base voltage of the transistor Q4 down to GND, and Q4 being a PNP device also starts to conduct thereby coupling the first and second capacitors C1 and C2, whereby the stored energy in C1 flows into C2.

When the voltage across the second capacitor C2 reaches the breakdown voltage of the zener diode D1, the voltage across R6 exceeds the $V_{BE}$ breakdown voltage of the transistor Q3 and Q5, being an NPN device, therefore conducts. This pulls the base voltage of the transistor Q1 down to GND, and Q1 being a NPN device cuts off. The voltage at the base of the transistor Q2 therefore goes high and Q2, being a PNP device, also cuts off thereby preventing the flow of current through the resistor R5, which would otherwise continue unnecessarily to waste energy.

The voltage across the second capacitor C2 is now maintained by the voltage output by the power supply 44 and the steady state operation of the power supply is therefore maintained without the continued operation of the startup circuit.

It will be appreciated that the functionality of the circuit shown in FIG. 3 can be realized using different circuit components than those shown in FIG. 4.

It will also be understood that the invention contemplates within its scope not only the startup circuit but also a power supply containing such a startup circuit, being either integral therewith or connected thereto externally. Such a power supply has been found to be particularly efficient for use in powering light emitting diodes (LEDs) and may be supplied as part of an LED lighting system. Moreover, such a power supply is amenable for connection across power supply sources of varying voltage, such as 85-277 VAC, and is equally efficient at all voltages in the range since the startup circuit is disconnected as soon as the power supply reaches steady state. Were this not the case, the voltage dropped across the resistor R5 would depend on the voltage on the output rail 33 and more energy would be wasted at higher supply line voltages. Thus, the drawback of variations in efficiency at different supply line voltages is avoided.

As has been noted, it is important that such power supplies have near unity power factor. To this end, a high capacitance at the input of the startup circuit as is used in JP 2001275347 must be avoided and power factor is reduced by means of a suitable power factor correction circuit in the power supply, or connected to an output thereof Such power factor correction circuits are known per se and are not themselves a feature of the invention. However, the provision of power factor correction in power supplies intended for low power output, in the order of hundreds rather than thousands of watts, militates against the connection of high capacitance at the input of the startup circuit and the invention therefore embraces a power supply having power factor correction and the startup circuit as described.

The invention claimed is:

1. Startup circuit for a power supply, said startup circuit comprising:
   an input for connecting a source of high voltage thereto,
   an output rail for feeding rectified voltage to the power supply,
   a first capacitor coupled to the output rail for storing energy when voltage is first applied to the input,
   a second capacitor coupled to an output of the power supply for storing energy when a voltage appearing at the output of the power supply reaches substantially steady state, and
   a switching circuit coupled to the first energy storage device and to the second energy storage device and being responsive to the first energy storage device having sufficient energy for transferring said energy to the second energy storage device and disconnecting the first energy storage device from the output rail;
wherein:
   the power supply is a universal or variable power supply that is adapted to operate over a range of power supply voltages fed to said input, a starting resistor is coupled between the output rail and the first energy storage device for sourcing current to the first energy storage device, a current source is connected to the input for charging the first capacitor, and a first input of a first comparator is coupled to an output of the first capacitor and a second input of the first comparator is coupled to a first reference voltage for generating a first switching signal when the output of the first capacitor exceeds the first reference voltage;

a first input of a second comparator is coupled to an output of the second capacitor and a second input of the second comparator is coupled to a second reference voltage for generating a second switching signal when the output of the second capacitor exceeds the second reference voltage;

the switching circuit is responsive to the first capacitor having sufficient energy for disconnecting the starting resistor from the output rail; and the switching circuit is responsive to the first switching signal for changing from an initially open circuit wherein the first capacitor is isolated from the second capacitor to a closed circuit whereby the first capacitor is connected in parallel with the second capacitor; and is responsive to the second switching signal for disabling charge flow to the first capacitor.

2. The startup circuit according to claim 1, being part of a power supply for an LED lighting system.

3. The startup circuit according to claim 1, wherein the switching circuit includes:

a first switch coupled to the current source and having an initial state wherein the current source is coupled to the first capacitor and having a second state wherein the current source is decoupled from the first capacitor, and a second normally open switch coupled between respective outputs of the first and second capacitors.

4. The startup circuit according to claim 3, wherein the first and second switches include semiconductor devices.

5. The startup circuit according to claim 4, wherein the first and second switches are bipolar junction transistors.

6. The startup circuit according to claim 1, wherein the first comparator includes a zener diode.

7. The startup circuit according to claim 1, wherein the second comparator includes a zener diode.

8. The startup circuit according to claim 1, wherein the current source includes a transistor for feeding current through a resistor.

9. The startup circuit according to claim 1, wherein the switching circuit includes a first switch comprising resistors in combination with a transistor for controlling the current source.

10. The startup circuit according to claim 1, wherein the switching circuit includes a second switch comprising resistors in combination with a transistor.

11. A universal or variable power supply including a startup circuit, said startup circuit including:

a first capacitor coupled to the output rail for storing energy when voltage is first applied to the input, a second capacitor coupled to an output of the power supply for storing energy when a voltage appearing at the output of the power supply reaches substantially steady state, and a switching circuit coupled to the first energy storage device and to the second energy storage device and being responsive to the first energy storage device having sufficient energy for transferring said energy to the second energy storage device and disconnecting the first energy storage device from the output rail;

wherein:

the power supply is a universal or variable power supply that is adapted to operate over a range of power supply voltages fed to said input, a starting resistor is coupled between the output rail and the first energy storage device for sourcing current to the first energy storage device, a current source is connected to the input for charging the first capacitor, and a first input of a first comparator is coupled to an output of the first capacitor and a second input of the first comparator is coupled to a first reference voltage for generating a first switching signal when the output of the first capacitor exceeds the first reference voltage;

a first input of a second comparator is coupled to an output of the second capacitor and a second input of the second comparator is coupled to a second reference voltage for generating a second switching signal when the output of the second capacitor exceeds the second reference voltage;

the switching circuit is responsive to the first capacitor having sufficient energy for disconnecting the starting resistor from the output rail; and the switching circuit is responsive to the first switching signal for changing from an initially open circuit wherein the first capacitor is isolated from the second capacitor to a closed circuit hereby the first capacitor is connected in parallel with the second capacitor; and is responsive to the second switching signal for disabling charge flow to the first capacitor.

12. The universal or variable power supply according to claim 11, being an integral unit.

13. The universal or variable power supply according to claim 11, being part of an LED lighting system.

14. The universal or variable power supply according to claim 11, including a power factor correction circuit.

* * * * *